United States Patent [19]

Browning

[11] 4,126,324
[45] Nov. 21, 1978

[54] COLLAPSIBLE TRAILER

[76] Inventor: Willard A. Browning, 1302 Elder St., Denver, Colo. 80221

[21] Appl. No.: 741,788

[22] Filed: Nov. 15, 1976

[51] Int. Cl.$^2$ ............................................. B62D 21/14
[52] U.S. Cl. ..................................... 280/42; 280/656; 296/10; 296/26
[58] Field of Search ................. 280/42, 639, 656, 638; 296/10, 26, 27, 100, 52, 53; 301/128; 180/DIG. 2

[56] References Cited

U.S. PATENT DOCUMENTS

| | | | |
|---|---|---|---|
| 257,235 | 5/1882 | Moore | 296/53 |
| 611,675 | 10/1898 | Brookmeyer | 280/42 |
| 830,534 | 9/1906 | Sheridon | 296/100 X |
| 892,163 | 6/1908 | Kidd | 296/52 |
| 1,982,935 | 12/1934 | Staugaard | 280/42 |
| 3,521,927 | 7/1970 | Barry | 296/100 |
| 3,612,600 | 10/1971 | Salichs | 280/27 |
| 3,781,030 | 12/1973 | Ekedal | 280/42 X |
| 3,979,133 | 9/1976 | Morris | 280/42 |

FOREIGN PATENT DOCUMENTS 591,928  7/1925  France ....................................... 280/42
382,730  11/1932  United Kingdom ...................... 301/128

Primary Examiner—Evon C. Blunk
Assistant Examiner—Michael J. Forman
Attorney, Agent, or Firm—Sheridan, Ross, Fields & McIntosh

[57] ABSTRACT

The trailer of this invention comprises a plurality of readily foldable or separable components to provide a full width trailer for hauling conventional goods or a narrow trailer for special hauling purposes or for storage in a limited space. In addition it may be readily dismantled into a group of relatively small components which may be packed in a vehicle trunk or in a small storage space. In one form it includes two side frames with upstanding side boards, a leaf spring detachably connected under each side frame, and a wheel carrying stub axle fixedly connected to the spring. Cross braces connect the two frames and a cross-axle assembly of variable effective length connects the two stub axles. Fore and aft floor boards are hingedly connected to the frames and to each other, and one or more may be folded to define a narrower trailer on occasion. The trailer may be dismantled into the components mentioned for storage or transport.

11 Claims, 18 Drawing Figures

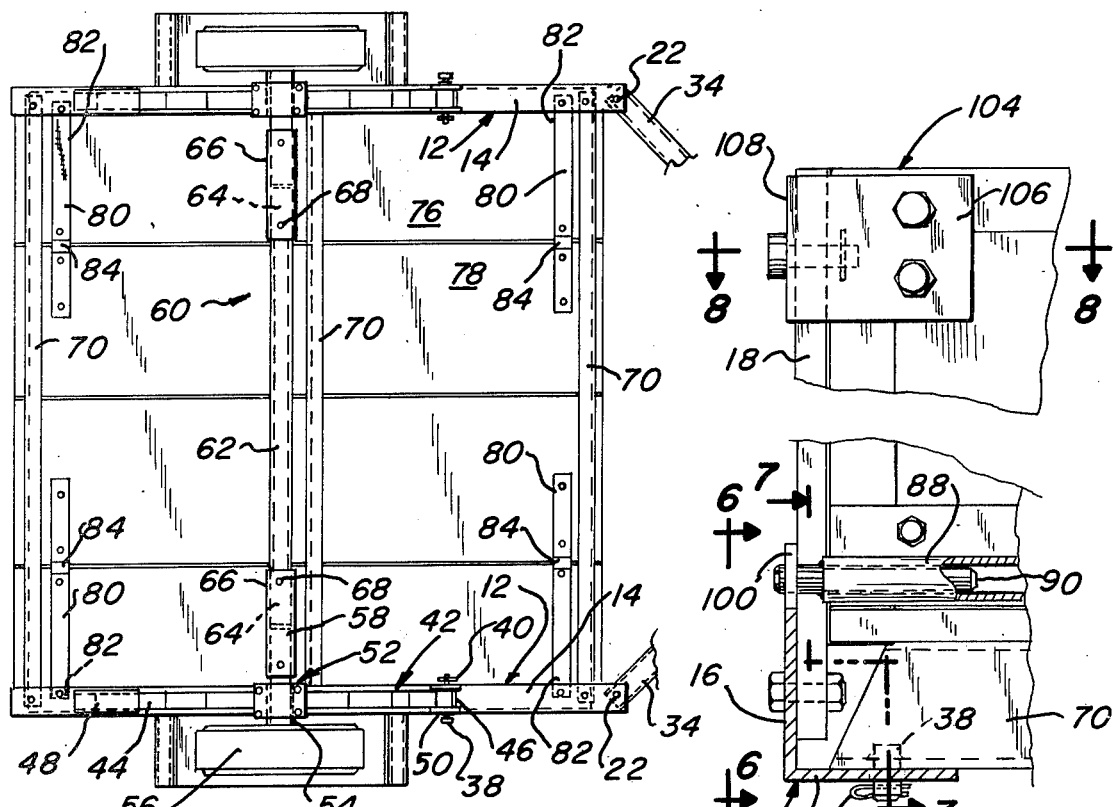
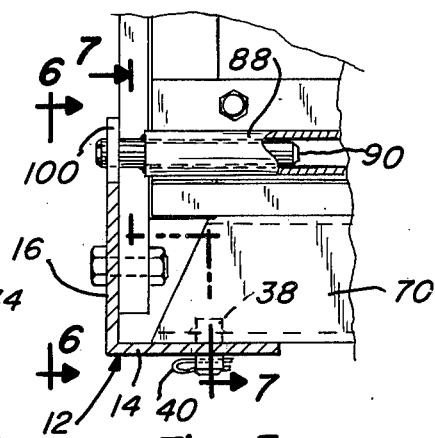
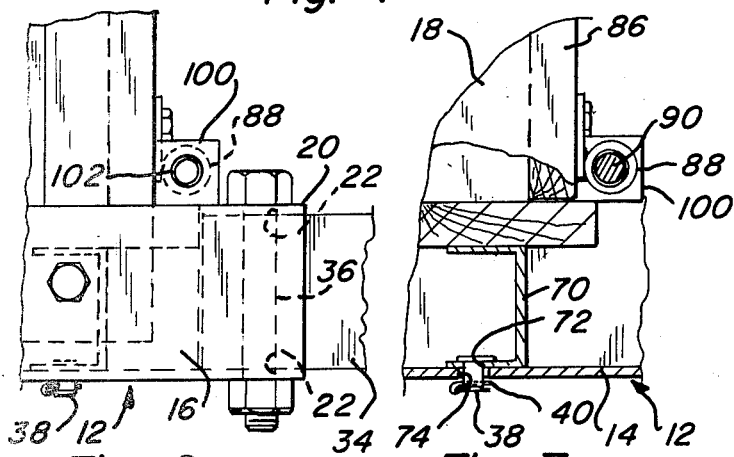
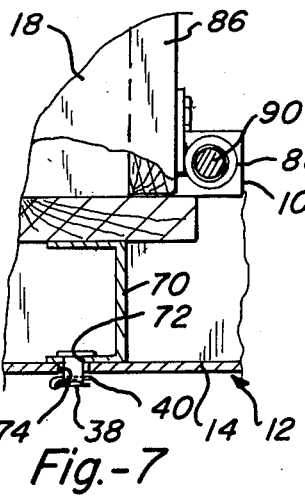
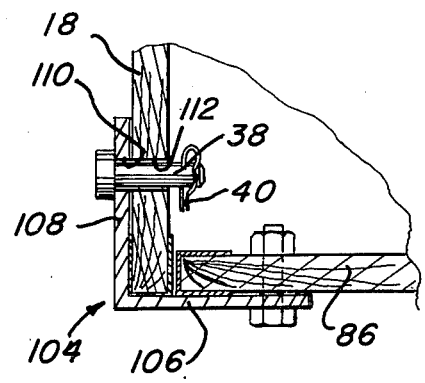
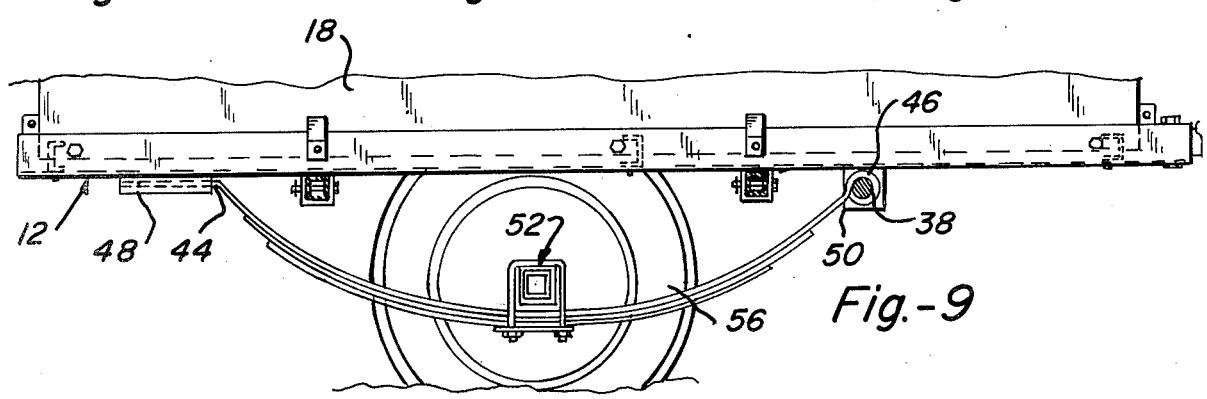

COLLAPSIBLE TRAILER

BACKGROUND OF THE INVENTION

This invention lies in the field of trailers of the general type towed by passenger vehicles and is directed to such trailers which may be reduced in size or dismantled for storage or transport. It is more particularly directed to such trailers which may be reduced or dismantled with a minimum of time and effort while retaining the stability and ruggedness of conventional trailers.

Small trailers suitable for carrying camping equipment and supplies and which may be towed by the average passenger car without difficulty have become increasingly popular in recent years. Even though they are small compared to a passenger car they are still wide enough and long enough to require virtually the same amount of storage space in a garage or shed. Hence, such a space, if available, must be set inside permanently for a vehicle which is used only occasionally or the trailer must be left out of doors which is generally undesirable.

It is not uncommon to tow a trailer long distances to deliver a load to a destination, after which it must remain in tow during the return trip requiring more driver attention than a vehicle without a tow.

Many efforts have been made to overcome these disadvantages but such efforts have been met with little or no success. For the purpose of reducing storage space, the trailer beds have been made removable from the chassis frames. With this arrangement a trailer bed may be set in vertical position and stored against a wall. The chassis frame and wheels will still take up almost as much floor space as the total trailer. This may be handled by upending the frame and storing it against a wall. The wheels will still project and form a substantial obstacle. In addition, a considerable amount of physical effort is required for the actions just mentioned.

Another scheme which has been tried is folding the wheels under the bed into somewhat flat position, upending the trailer, and storing it against the wall. This probably reduces the space requirement slightly but in return it calls for even greater physical effort because the entire vehicle now must be handled as a unit.

It has also been proposed to take the entire vehicle apart, removing the wheels from the axle, removing the axle from the springs, and disconnecting the various panels of the bed from each other and from the frame. This reduces the bulk but calls for much time and effort disconnecting innumerable bolts and nuts, and especially removing the wheels from the axle with the inevitable grime deposited on the hands and clothing.

SUMMARY OF THE INVENTION

The trailer of the present invention overcomes the disadvantages mentioned above and provides a simple construction which may be greatly reduced in width for inside storage and which may also be readily dismantled for home storage or for transport in the trunk of a passenger car.

Generally stated, in its presently preferred form the construction includes a pair of elongate rigid side frames extending fore and aft in laterally spaced relation, each frame having an upstanding elongate side board fixedly connected thereto and extending along the major portion of the length of the frame, with the frames being supported by a road engaging carriage. Connector means are provided at the forward end of each frame for attachment to a towing device.

The road engaging carriage comprises a vehicle type leaf spring connected to the underside of each frame, a stub axle fixedly connected to the spring and having an outer end carrying a road wheel and an inner end provided with a connector formation, and a cross-axle assembly of variable effective length having means at each end for engagement with the connector formation of one of the stub axles. When the assembly is at its maximum effective length laterally of the trailer it serves to maintain the side frames at a first lateral spacing corresponding to the full width configuration of the trailer and when it is at its minimum effective length laterally of the trailer it serves to maintain the side frames at a second lateral spacing corresponding to a substantially narrower configuration of the trailer.

A plurality of cross braces are spaced longitudinally from each other and extend between the side frames, being connected at their ends to the frames to complete a supporting structure, and a plurality of elongate floor boards are adapted to lie on the cross braces in attitudes parallel to the longitudinal axis of the trailer.

While any number of floor boards may be used, it is presently preferred to employ four. The outer floor boards, nearer to the side boards, are hingedly connected at spaced points along their length to the side frames and may be folded up against the side boards. The inner floor boards are hingedly connected to the outer boards at spaced points along the length of their adjoining edges, and the two may be swung to positions overlying the two faces of a respective side board with their hinged connection overlying the upper edge of the side board. When all of the floor boards are lying on the cross braces an end gate is connected to each end of the side boards to lie on top of the forward and aft ends of the floor boards and retain them in position on the cross braces. To complete the trailer, a towing device is connected to the connector means on the forward end of each frame.

When it is desired to change the trailer to its narrower configuration the end gates are disconnected and the cross-axle assembly is reduced to its shorter effective length after swinging the floor boards up to their folded position. In the narrower configuration the lateral spacing between the side frames is the width of one floor board. Therefore either floor board hinged to a side frame is lowered to cause its edges to lie on the frames and its companion board is folded to lie on it to serve as the bed for the narrow box.

All of the major components are held together with quick-disconnect fasteners except that the spring and stub axle are fixedly connected and the wheel is mounted on the stub axle in normal rotatable fashion. As a result of this arrangement the entire trailer may be dismantled in a few minutes into a plurality of relatively small components. The cross-axle assembly is disconnected from the stub axles. The springs are disconnected from the frames. The cross braces are disconnected from the frames. Each pair of floor boards is folded over its respective side board, and the three boards remain connected to the frame.

One of the advantages of the construction outlined above is that the trailer may be made narrow enough to stand beside a passenger car in assembled relation in all but very narrow garages, and may be maneuvered readily because it still rests on its road wheels. If space is too limited for such storage it can be readily dismantled in minutes into the components described above. All of these components are relatively light and small so that they can be easily handled and may be stored in a minimum amount of space. They may, of course, be placed separately wherever any space is available.

Another advantage is that the dismantled trailer can be stored in its entirety in a conventional passenger car trunk, including the stub axle and wheels. Thus if it must be transported empty on a long return trip it may be carried directly instead of towed.

BRIEF DESCRIPTION OF THE DRAWINGS

Various other advantages and features of novelty will become apparent as the description proceeds in conjunction with the accompanying drawings, in which:

FIG. 4 is a bottom plan view of the trailer of FIG. 1;

FIG. 5 is a partial front elevational view, partly in section, taken on line 5—5 of FIG. 3;

FIG. 6 is a partial side elevational view taken on line 6—6 of FIG. 5;

FIG. 7 is a sectional view taken on line 7—7 of FIG. 5;

FIG. 8 is a sectional view taken on line 8—8 of FIG. 5;

FIG. 9 is a partial side elevational view, partly in section, taken on line 9—9 of FIG. 2;

DESCRIPTION OF PREFERRED EMBODIMENTS

Figure 1:
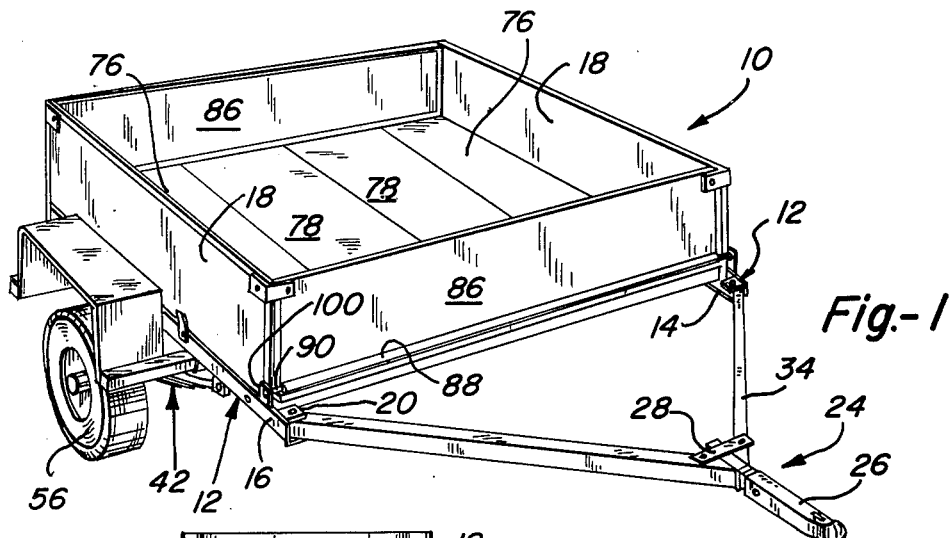
FIG. 1 is a perspective view of the completely assembled trailer with its hitch, ready for use.
Figure 2:
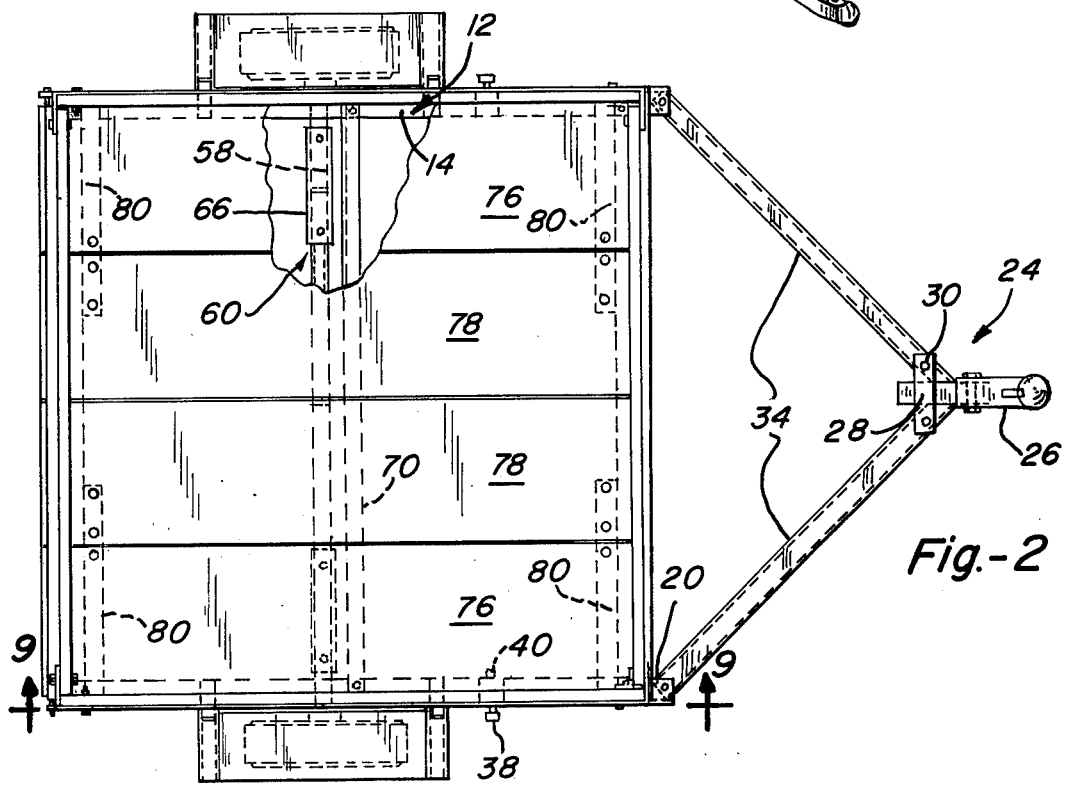
FIG. 2 is a top plan view of the trailer of FIG. 1.
Figure 3:
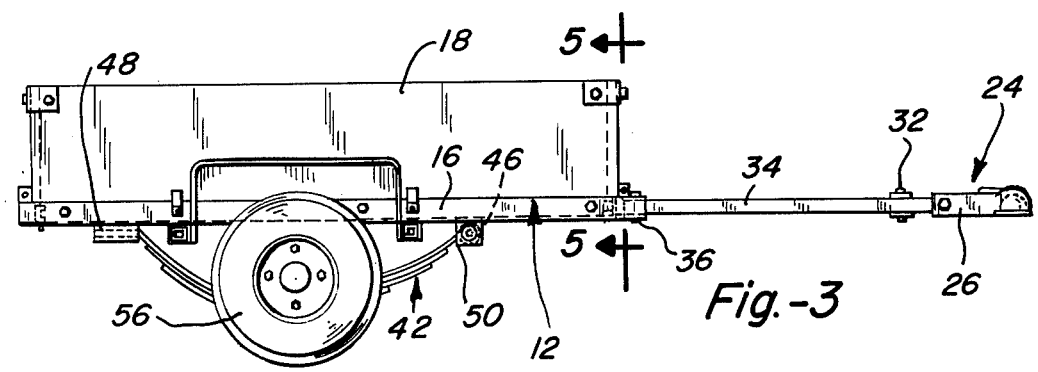
FIG. 3 is a side elevational view of the trailer of FIG. 1.

The trailer in completely assembled form is schematically illustrated in FIGS. 1 to 4, in which the structure 10 includes a pair of elongate rigid side frames 12 of angle iron extending fore and aft and arranged with a first lateral spacing corresponding to the maximum or full-width configuration of the vehicle. A first flange 14 of each frame is in a horizontal plane and extends inward toward the opposite frame. The second flange 16 of each frame is in a vertical plane and an elongate upstanding side board 18 is fixedly connected thereto and extends along the major portion of the length of the frame. The side boards may be connected to the flanges by rivets or by bolts and nuts as indicated in FIG. 5. Connector formations are provided at the forward ends of the frames for attachment to a towing device. These formations are defined by the forward end of each bottom flange 14 and a small plate 20 welded to the upper edge of flange 16 and extending horizontally to produce a channel, with apertures 22 through the plate and flange. A towing device 24 comprises a standard hitch 26 carrying upper and lower cross flanges 28 welded thereto and formed with apertures 30 to receive pivot pins 32. A pair of draw bars 34 are pivotally connected at their forward ends to flanges 28 by pins 32, and their aft ends are pivotally connected to the connector formations on the frames by pivot pins 36. The latter may be bolts and nuts as shown in FIG. 6 or quick-detachable headed pins 38 with safety clips 40 as illustrated in FIG. 8.

Vertically yieldable support means are connected to and extend beneath the side frames to mount the trailer on road wheels. Such support means may take various forms but it is presently preferred to utilize vehicle type leaf springs 42. Each spring is formed at one end with a flat horizontal tip portion 44 and is provided at its other end with a standard eye 46. A generally rectangular socket 48 is secured to the under side of each flange 14 with its axis extending fore and aft, and a standard spring mounting eye 50 is secured to the under side of flange 14 at a predetermined longitudinal spacing. To mount the spring, its flat tip portion 44 is first inserted in socket 48 and then the opposite end of the spring is positioned with eyes 46, 50 in lateral registry. A quick-detachable pin 38 is passed through the eyes and a safety clip 40 is used to secure the pin in place. A stub axle 52 is fixedly connected to the spring in a lateral direction and its outer end 54 carries a road wheel 56 while its inner end is provided with a connector formation 58. The latter is preferably an extension having a square cross section.

Figure 16:
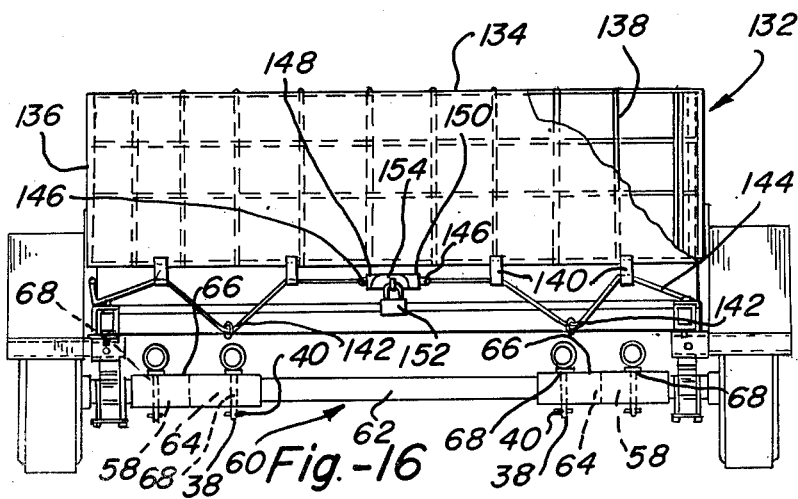
FIG. 16 is an elevational view, partly in section, taken on line 16—16 of FIG. 14.

A cross-axle assembly 60 having a variable effective length is used to connect the two stub axles. While assembly 60 may take various forms to accomplish the variation in its effective length, it is presently preferred to provide a long central shank 62, which may be hollow or solid, with at least its end portions 64 being of the same cross sectional size and shape as the connector formations on the stub axles, together with short sleeves 66 which are sized and shaped to slidably fit over end portions 64 and formations 58. As best seen in FIGS. 4 and 16, each sleeve 66 fits over an end portion 64 and a formation 58. Registered apertures 68 are formed in formations 58, end portions 64 and sleeves 66, and quick-detachable pins 38 are passed through the apertures and secured by safety clips 40 to connect the assembly and the stub axles together. When all of these elements are connected together as shown they maintain the side frames at a first lateral spacing corresponding to the full width configuration of the trailer. If desired, one of the sleeves may be fixedly secured to shank 62 but the other sleeve will remain separable.

Figure 18:
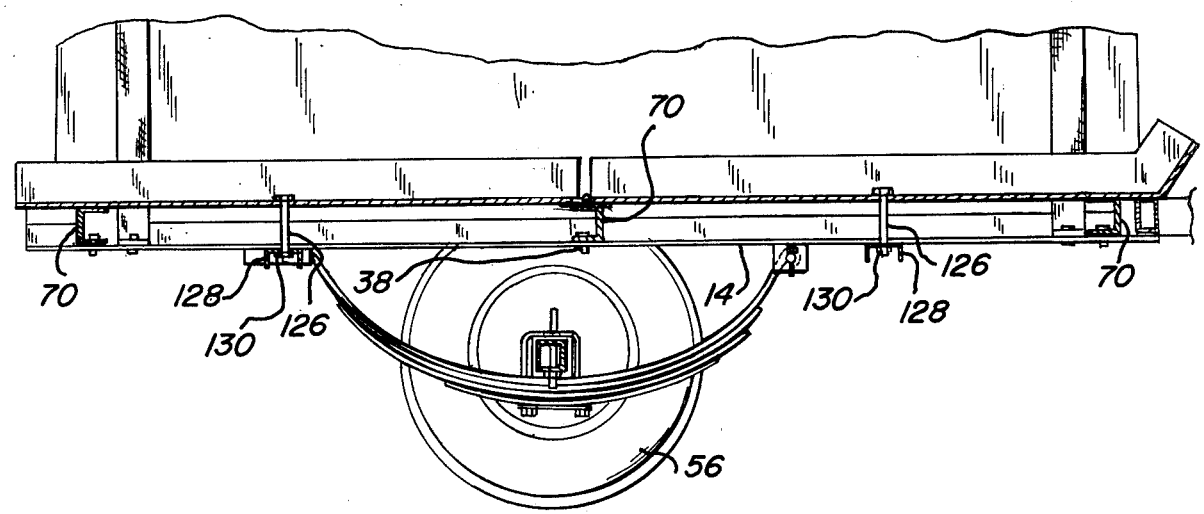
FIG. 18 is a sectional view taken on line 18—18 of FIG. 17.

A plurality of cross braces 70 in the form of channels are provided to extend across the gap between the side frames when the trailer is in full width configuration. The ends of each brace lie on the flanges 14 in an attitude with one side wall on the flange as best seen in FIGS. 7 and 18. Apertures 72 in the braces register with apertures 74 in flanges 14, and pins 38 pass through the apertures and are secured by safety clips 40.

A plurality of elongate floor boards 76, 78, preferably four, are arranged to lie on the cross braces and extend fore and aft parallel to the frames and side boards and in edge to edge relation to form the bed of the trailer. Elongate flexible strap hinge means 80, preferably rubber belting, is applied to the floor boards near each end, with hinge portions 82 connecting boards 76 to the side frames and hinge portions 84 connecting boards 76 to boards 78. Each hinge portion includes a surplus length of material to permit relative displacement of board 76 with respect to the side frame and to board 78. The strap hinge means is secured to the under sides of the boards to avoid damage by cargo carried on the bed.

Figure 10:
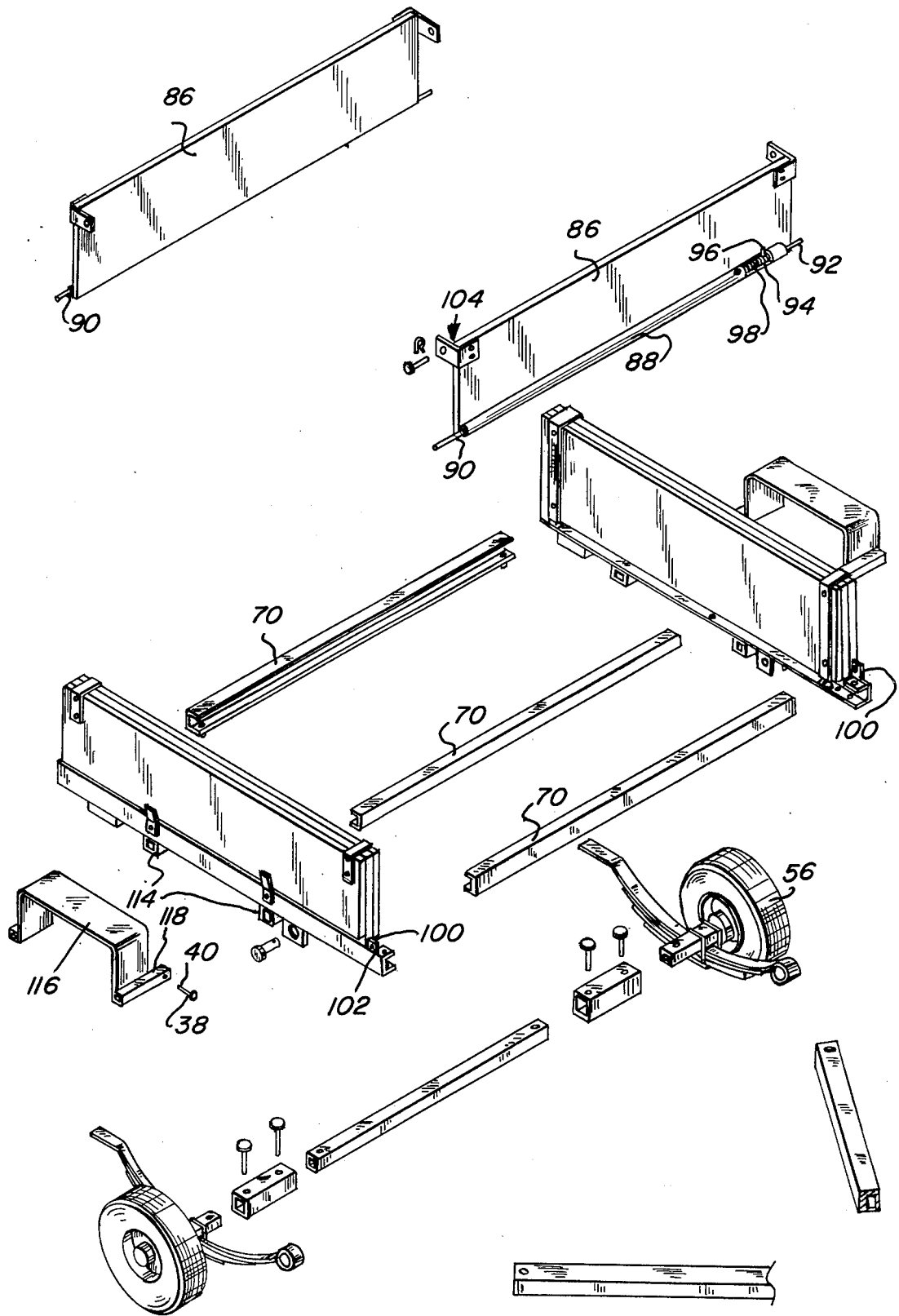
FIG. 10 is an exploded perspective view of the trailer of FIG. 1, illustrating the relation of the components.

To complete the box a pair of end gates 86 are provided, each with a height approximating the height of the side boards and a length corresponding to the distance between the side boards. An elongate tubular member 88 extends along the lower margin of each gate and is provided at a first end, as best seen in FIGS. 5 and 10, with a pivot pin 90 welded in the tube and extending a short distance out beyond its end. As seen in FIG. 10, a similar pivot pin 92 is slidably mounted in the second end of member 88. A slot 94 is formed in the wall of the tube for slidable reception of a limit pin 96 which is fixed in pin 92. A spring 98 within tube 88 engages limit pin 96 to urge it and pivot pin 92 outward, and contact of pin 96 with the outer end of the slot limits such outward movement.

An upstanding lug 100 is fixed on the forward and aft end of each frame and is formed with a lateral aperture 102. The gate is placed in position by first inserting the fixed pivot pin 90 in one lug and then snapping the slidable pivot pin 92 into the lug on the opposite frame. In its final position, as seen in FIG. 8, the end edges of the gate fit just within side boards 18, and an angle bracket 104 at each upper corner has a first flange 106 fixed to the gate and a second flange 108 overlying the side board with an aperture 110 registering with an aperture 112 in the side board. Pin 38 passes through the apertures and is secured by safety clip 40 to lock the end gate in place. As best seen in FIG. 7, each end gate rests on the ends of the floor boards to hold them in position on the cross braces.

Laterally extending sockets 114 are fixed to the under side of each frame in spaced relation. Fenders 116 are provided with inward projecting mounting members 118 which are inserted in the sockets to mount the fenders in working position. Pins 38 pass through aligned apertures in the sockets and mounting members and are detachably retained by clips 40.

Figure 11:
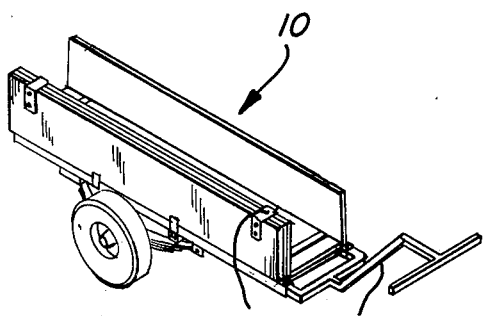
FIG. 11 is a perspective view of the trailer in its narrowest configuration.
Figure 12:
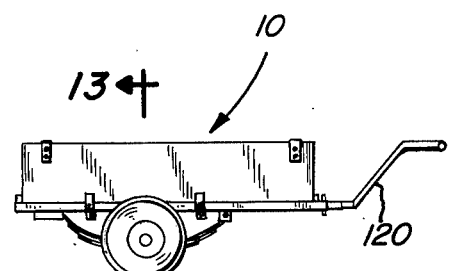
FIG. 12 is a side elevational view of the trailer of FIG. 11.
Figure 13:
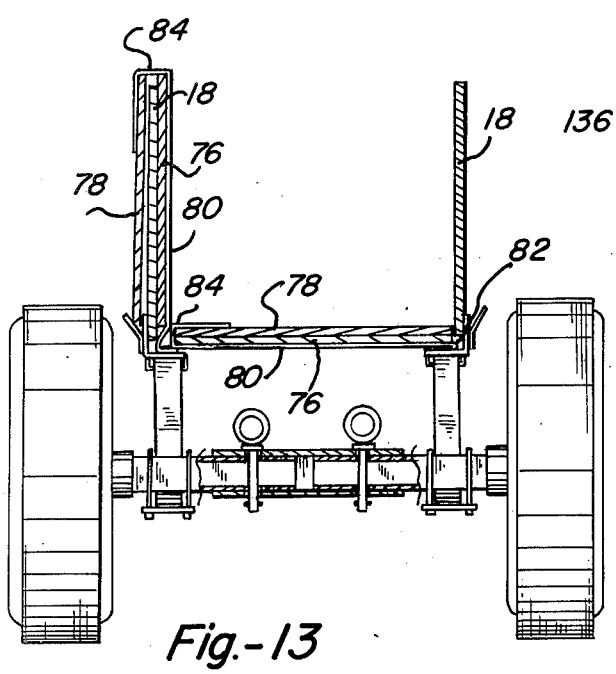
FIG. 13 is a sectional view taken on line 13—13 of FIG. 12.

When it is desired to reduce the trailer to its narrow configuration for storage or special use, the floor boards are raised and folded into positions with boards 76 overlying one face of side board 18 and boards 78 overlying the other face with hinge portions 84 overlying the upper margins of the side boards. Cross braces 70 are then disconnected from the side frames. The cross-axle assembly is disconnected from the stub axles and the longer component, consisting of the shank 62 and one sleeve 66, is set aside. The other sleeve 66 is then connected to both axles as in FIG. 13 to maintain the side frames at a second lateral spacing corresponding to the predetermined narrower configuration of the trailer. This is preferably the width of one floor board. A separate floor board of appropriate width may be located in the gap and laid on the flanges 14 of the side frames or, as indicated in FIGS. 11 and 13, one floor board 76 with its companion board 78 may be swung back down with board 76 lying on the side frames and board 78 lying on board 76. If desired, a small light-weight handle 120 may be substituted for towing device 24 to maneuver the trailer.

Figure 17:
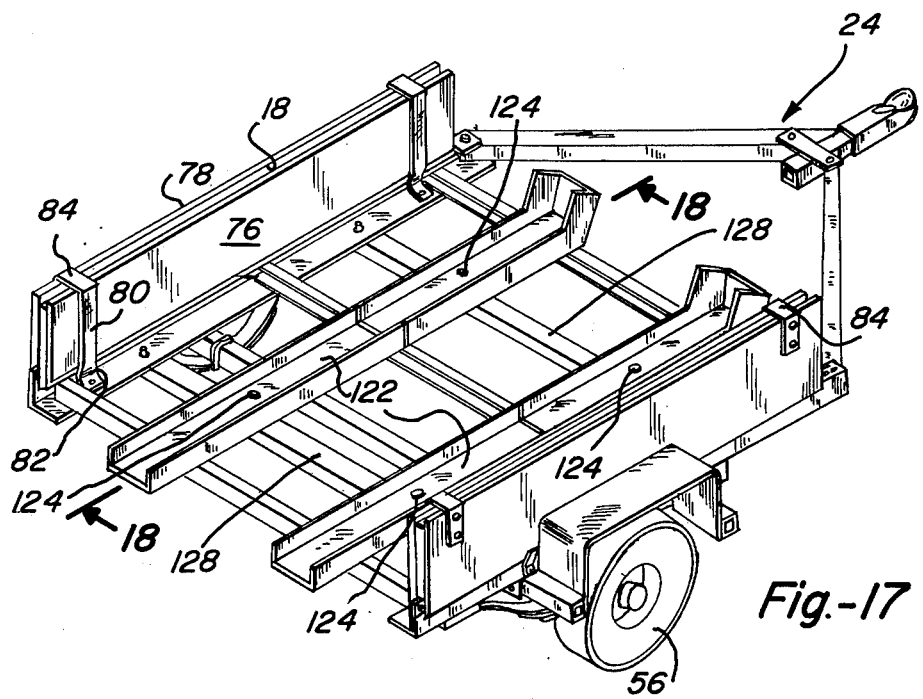
FIG. 17 is a perspective view of another embodiment of the trailer.

The trailer may be readily modified as shown in FIGS. 17 and 18 for use in transporting a pair of motorcycles or the like. For this purpose, floor boards 76, 78 are folded up and over side boards 18 after removing the end gates. A pair of centrally hinged upwardly open channels 122 are laid on the cross braces in fore and aft laterally spaced relation. Apertures 124 are formed in each half of each channel to receive bolts 126. A hold-down channel 128 is positioned under the side frames and extending laterally beneath the apertures 124 in each half of each upper channel. Bolts 126 are then passed down through the channels and nuts 130 are threaded on the bolts to pull channels 122 down tightly on the cross braces and hold them securely in place.

Figure 14:
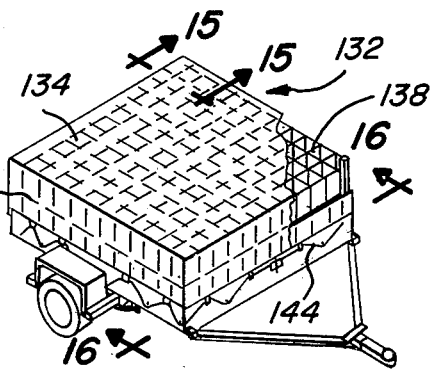
FIG. 14 is a perspective view of the trailer provided with a security cover.
Figure 15:
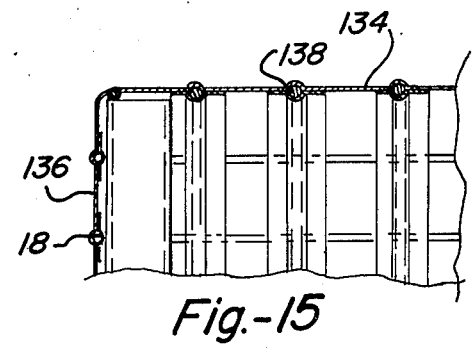
FIG. 15 is a sectional view taken on line 15—15 of FIG. 14.

For the purpose of protecting the cargo from both weather and thievery, a form-fitting security cover 132 is provided as shown in FIGS. 14, 15, and 16. It includes a top section 134 corresponding in planform to the planform of the trailer box and side walls 136 have a depth corresponding to the height of side boards 18. The material of the cover is reinforced with a plurality of spaced metal cable members 138 arranged in mesh formation with a spacing small enough to prevent removal of any objects larger than a few inches across. Tie-down loops 140 are secured to the lower margin of the cover at suitably spaced intervals and cooperating tie-down loops 142 are mounted around the periphery of the trailer. A cable 144 is passed alternately through the upper and lower loops and its ends 146 are brought together with hasp components 148, 150. A lock 152 is then passed through eye 154 of the hasp and closed to secure the cargo.

What is claimed is:
1. A collapsible trailer comprising:
   a pair of elongate rigid side frames extending in parallel fore and aft relation having elongate upstanding side boards connected thereto and extending along the major portion of the lengths of the side frames;
   connector means at the forward ends of the frames for attachment to a towing device;
   vertically yieldable support means connected to and extending beneath each frame;
   a laterally extending stub axle connected to each support means and having an outer end carrying a road wheel and an inner end provided with a connector formation;
   a cross-axle assembly having means at each end for engagement with the connector formation of one of the stub axles;
   a plurality of cross braces connected at their ends to spaced points along the lengths of the side frames to complete a supporting structure;
   a plurality of elongate floor boards adapted to lie on the cross braces in attitudes parallel to the longitudinal axis of the trailer;
   at least one floor board being hingedly connected at spaced points along its length to each side frame to swing between a first position lying on the cross braces and a second position juxtaposed to its respective side board;
   and the cross braces being readily disconnectable from the side frames to permit lateral collapse of the trailer to a narrower configuration;
   the cross-axle assembly having a variable effective length laterally of the trailer to selectively maintain the side frames at a first lateral spacing corresponding to the full width configuration of the trailer and at a second lateral spacing corresponding to the narrower configuration of the trailer; in which at least one of the floor boards hingedly connected to a side frame has a width corresponding to the lateral spacing of the side frames in the narrower configuration of the trailer and lies with its longitudinal edges on the side frame to constitute the trailer bed in such configuration.

2. A trailer as claimed in claim 1; in which at least a first one of the floor boards hingedly connected to a first frame is provided with a second floor board hingedly connected thereto along their adjoining edges;

each of the joined floor boards has a width substantially the same as the height of the side board;

and the two joined floor boards are swingable between a first position lying on the cross braces and a second position overlying the opposite faces of the side board, with the hinge connection between the two floor boards overlying the upper edge of the side board.

3. A trailer as claimed in claim 2; in which the second floor board hingedly connected to the second side frame is also provided with a second floor board hingedly connected thereto along their adjoining edges;

each of the joined floor boards has a width substantially the same as the height of the side board;

and the two joined floor boards are swingable between a first position lying on the cross braces and a second position overlying the opposite faces of the side board, with the hinge connection between the two floor boards overlying the upper edge of the side board.

4. A trailer as claimed in claim 2; in which the hinge connections for the floor boards comprise flexible strap hinge means near each end of the boards;

and each hinge portion between the first board and its frame and between the first and second board includes a surplus length of material to permit relative displacement of the parts.

5. A trailer as claimed in claim 1; in which an end gate having upper and lower portions is provided for each end of the trailer and has a length corresponding to the distance between the side boards;

the lower portions are quick-detachably connected to the frames and the upper portions are quick-detachably connected to the side boards;

and the lower edges overlie the forward and aft ends of the floor boards to retain them in position on the cross braces.

6. A trailer as claimed in claim 5; in which an upstanding lug with a lateral aperture is fixed on the forward and aft end of each frame;

and the lower marginal portion of each end gate is provided with a fixed connector pin at one end to engage a lug aperture on one frame and with a spring-loaded sliding connector pin at the opposite end to engage a lug aperture on the other frame.

7. A trailer as claimed in claim 6, in which an elongate tubular mounting member extends along the lower margin of each gate on its outer face substantially from end to end of the gate;

the fixed connector pin is rigidly secured in one end of the mounting member;

and the sliding connector pin is mounted for axial movement in the opposite end of said mounting member.

8. A trailer as claimed in claim 1; in which the floor boards are located in their second positions;

a plurality of upwardly open vehicle support channels lie on the cross braces in general parallelism with the side boards and folded floor boards and in laterally spaced relation;

a plurality of cross bars are arranged laterally beneath the side frames in spaced relation;

and the channels are secured to the cross bars to hold the channels down in firm contact with the cross braces.

9. A trailer as claimed in claim 1; in which the cross-axle assembly comprises a plurality of longitudinally separable components, at least one of which is relatively short;

the short component is sized and shaped at each end to engage the connector formation of one of the stub axles;

and the length of the short component is selected to maintain the side frames at the second lateral spacing when it is connected to the two stub axles.

10. A trailer as claimed in claim 1; in which the cross-axle assembly comprises a long central shank having end portions of the same cross sectional shape and size as the connector formations on the stub axles and a short connecting sleeve at each end;

the sleeves are sized to slidably fit over the end portions of the shank and the connector formations on the stub axles;

matching apertures are provided in the assembly and the connector formations;

quick-detachable fasteners are located in the apertures to lock the assembly together and to lock it to the stub axles to maintain the side frames at a first lateral spacing corresponding to the full width configuration of the trailer;

and the fasteners are removable to facilitate breaking down the assembly and securing one sleeve to the two stub axles to maintain the side frames at a second lateral spacing corresponding to the narrower configuration of the trailer.

11. A trailer as claimed in claim 1; in which quick-detachable fasteners are provided to connect the cross-axle assembly to the stub axles, the vertically yieldable support means to the side frames, and the cross braces to the side frames;

the fasteners being readily removable to enable dismantling the trailer into a plurality of relatively small components for storage and transport.

* * * * *